United States Patent

[11] 3,556,037

[72] Inventors John P. Sloan, Jr.;
Bion L. Laubscher, Houston, Tex.
[21] Appl. No. 793,474
[22] Filed Jan. 23, 1969
[45] Patented Jan. 19, 1971
[73] Assignee Dresser Industries, Inc.
Dallas, Tex.
a corporation of Delaware

[54] BALLAST FLUID
14 Claims, 1 Drawing Fig.
[52] U.S. Cl. .................................................... 114/125
[51] Int. Cl. .................................................... B63b 43/06
[50] Field of Search ........................................... 114/125

[56] References Cited
UNITED STATES PATENTS
3,318,278  5/1967  Huebotter .................... 114/125

Primary Examiner—Trygve M. Blix
Attorneys—Robert W. Mayer, Daniel Rubin, Peter J. Murphy, Frank S. Troidl, Roy L. Van Winkle, William E. Johnson, Jr. and Roderick W. MacDonald ABSTRACT: Waterborne vessels are ballasted using a composition containing water, barite, and at least one of attapulgite, sepiolite, and chrysotile asbestos. The ballasting composition optionally contains at least one of polymer such as carboxymethylcellulose, a bacteriostatic agent, a corrosion inhibitor, and an alkalizer.

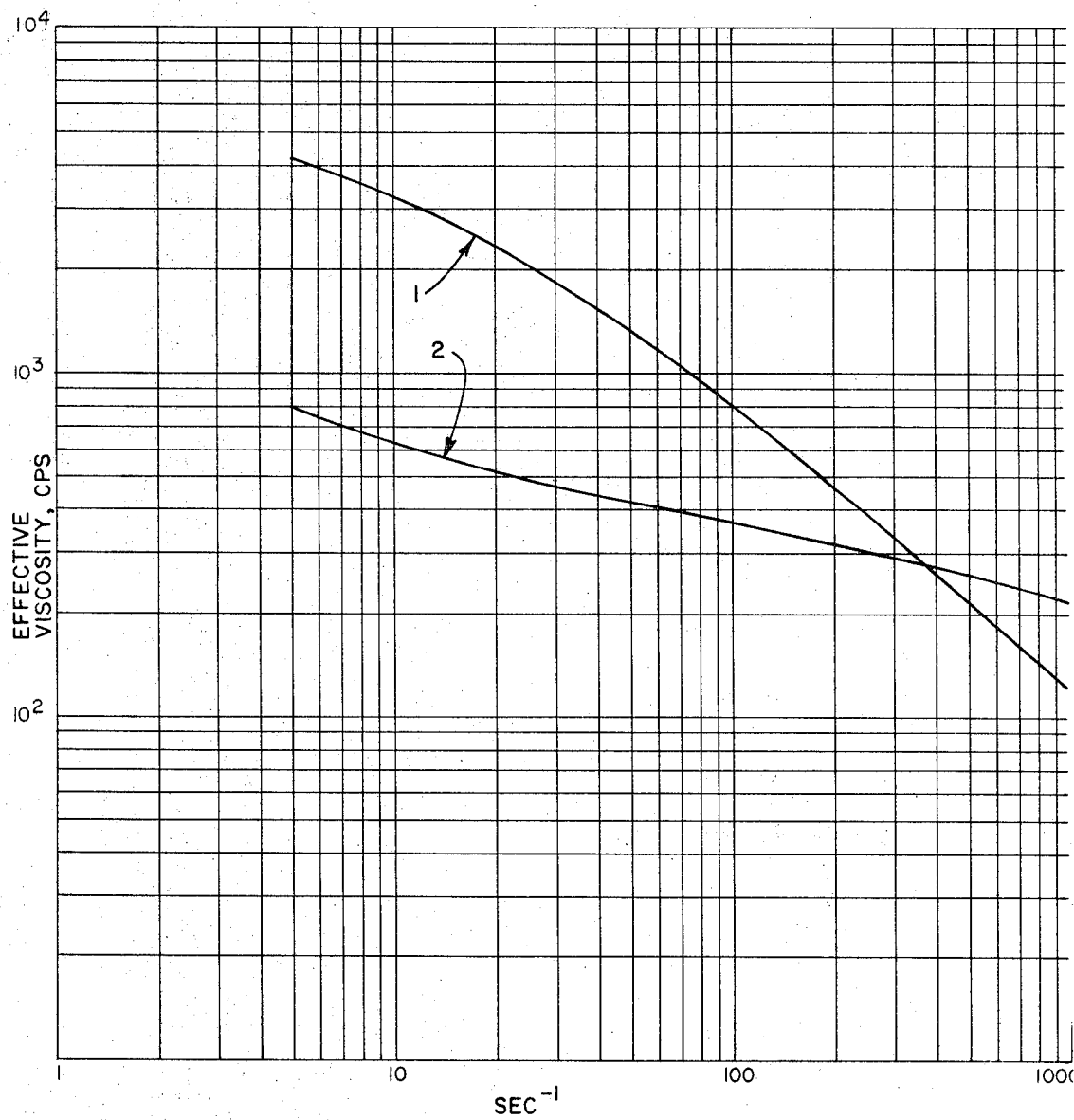
INVENTORS
JOHN P. SLOAN, JR.
BION L. LAUBSCHER
ATTORNEY

BALLAST FLUID

BACKGROUND OF THE INVENTION

Heretofore various liquids have been employed for ballasting waterborne vessels such as cargo ships. Ballasting comprises introducing a relatively heavy material into a lower portion of the vessel e.g., the ballast tanks on the bottom of the vessel, thereby altering (lowering) the center of gravity of the vessel and any cargo therein. The ballasting procedure adds stability to the vessel particularly when the vessel lists to one side.

The ballasting procedure is disclosed in U.S. Pat. No. 3,318,278, the disclosure of which is incorporated herein by reference. This patent discloses the use of a ballasting liquid formed from water, barite, bentonite, and a deflocculating agent in a quantity sufficient to prevent excessive gelation of the bentonite upon long standing.

SUMMARY OF THE INVENTION

It was unexpectedly discovered that in a composition of water and barite, the use of at least one of attapulgite, sepiolite, and chrysotile asbestos produced a ballast liquid which had substantially superior rheological properties, particularly viscosity, at both low and high shear rates as hereinafter discussed in detail in Example I.

It was further unexpectedly discovered that with the use of at least one of attapulgite, sepiolite, and chrysotile asbestos the necessity of a deflocculating agent was removed. The ballast liquids of this invention can, therefore, further be characterized by the substantial absence of any deflocculating agent therein without risk of excessive gelation upon long standing.

Therefore, according to this invention there is provided a method of ballasting a vessel by introducing into the ballast tanks of that vessel an effective ballasting amount of the liquid composition of this invention.

There is also provided the combination of a vessel whose ballast tanks contain the liquid composition of this invention.

There is also provided a ballast additive formed from barite and at least one of attapulgite, sepiolite, and chrysotile asbestos.

Ballast tanks in this invention are to be construed broadly to cover any lower portion of a vessel which can be made to receive and hold a liquid for any desired length of time.

Accordingly, it is an object of this invention to provide a new and improved method of ballasting waterborne vessels. It is another object of this invention to provide a new and improved combination of waterborne vessels and liquid ballast. It is another object to provide a new and improved ballast additive.

Other aspects, objects, and advantages of this invention will be apparent to those skilled in the art from this disclosure and the appended claims.

DETAILED DESCRIPTION OF THE INVENTION

The drawing shows a logarithmic comparative plot of effective viscosity in centipoise versus shear rate in reciprocal seconds for a ballast liquid in accordance with the prior art using bentonite and a deflocculent and a ballast liquid according to this invention using attapulgite without a deflocculent.

According to this invention, there is provided a ballasting method comprising introducing into the ballast tanks of a vessel an effective ballasting amount, i.e., an amount sufficient to lower the center of gravity of the vessel a predetermined amount, of a certain composition. The composition is formed from (1) comminuted or otherwise subdivided barite in an amount sufficient to give the composition a density of from about 125 to about 150 pounds per cubic foot, preferably from about 445 to about 650 pounds of barite per barrel of composition, and (2) one of attapulgite, sepiolite, chrysotile asbestos, and mixtures of at least two thereof in an amount effective for inhibiting the settling of the barite into a hard layer on the bottom of the ballast tank, preferably from about 10 to about 25 pounds of attapulgite, etc. per barrel of composition. The remainder of the composition is substantially water.

The water can be at least one of salt water, sea water, brine, brackish water, fresh water, and the like. The water is used in amounts necessary to complete the standard unit for the composition, i.e., the U.S. petroleum barrel of 42 U.S. gallons.

An advantage for the use of attapulgite, sepiolite, and chrysoltile asbestos over bentonite is that the former materials will give viscosity in salty water as well as fresh water at essentially the same concentration whereas bentonite will not give viscosity in salty water except at unusually high concentrations which are unsuitable for preparing high density fluids. An advantage for the use of salty water is that it is heavier than fresh water thereby adding to the weight of the ballast liquid.

Barite is well known in the art, available commercially, and therefore need not be additionally characterized. The barite should be subdivided to substantially all pass a 325 mesh screen (standard Tyler series). The barite can have a density in grams/cc of from about 4.0 to about 4.4. The most common grade available commercially, i.e., drilling mud grade, has an average specific gravity of about 4.25 grams/cc, and the formulations described herein are based on this average figure.

Attapulgite and sepiolite are well known clays and chrysotile asbestos is a well known species of asbestos. All are available commercially and because of their known sources, composition, and properties, need not be further characterized here. Further reference as to the character of these materials can be found in the publication "Reference Clay Minerals," American Petroleum Institute Research Project 49, published by Columbia University Printers, 1951, Columbia University, New York and "Mineralogy" by E. S. Dana, 4th Edition, 1955, John Wiley and Sons, Inc., New York, the pertinent disclosures of which are incorporated herein by reference. The attapulgite, sepiolite, and chrysotile asbestos are preferably employed in a comminuted or otherwise subdivided form, e.g., substantially all of the material passing a standard 60 mesh Tyler screen. The attapulgite can have a mud yield of from about 50 to about 150 barrels of 15 centipoise mud/ton of clay, preferably about 120 barrels/ton. The formulations described herein are based on drilling mud grade attapulgite having a yield of about 120 barrels/ton.

The above-described composition according to this invention can further be characterized by the substantial absence from the composition of any deflocculating agent or agents such as humates, lignosulfates, phosphates, and the like. With the use of attapulgite, etc., the composition does not gel excessively even upon long standing so that the deflocculating agents are omitted without loss of any of the functional results normally obtained with such agents.

It has further been found that even stronger resistance to the settling of barite can be obtained by adding certain polymers to the composition of this invention. The polymers are carboxymethylcellulose, polyacrylonitrile (such as "-Cypan"), vinyl maleic anhydride (such as "CyBen"), and mixtures of at least two thereof. These materials are employed in an amount effective to inhibit settling of the barite, preferably from about one-quarter to about 2 pounds per barrel of ballast liquid composition. These materials can also be employed in a subdivided form as described hereinabove for the attapulgite, etc.

Carboxymethylcellulose is well known in the art as CMC and is available commercially. The commercial product contains about 0.5 carboxymethyl groups per 6 carbon atoms and is normally in the form of an alkali metal (lithium, sodium, potassium, rubidium, cesium, and francium, particularly sodium and potassium) salt. The preferred polymer is sodium carboxymethylcellulose, pure grade, medium viscosity. The polyacrylonitrile and vinyl maleic anhydride polymers are also well known in the art and available commercially.

The compositions of this invention can also contain various conventional additives such as bacteriostatic agents, corrosion inhibitors, alkalizers, and the like.

The bacteriostatic agent can be employed in amounts sufficient to immunize the composition from substantial bacteria counts, preferably from about one-quarter to about 2 pounds per barrel of ballast liquid composition. The agents can be one of paraformaldehyde, glutaraldehyde, substituted phenols such as cresol, chlorinated phenols such as pentachlorophenol, and mixtures of at least two thereof.

A large number of corrosion inhibitors are available commercially and can be used in amounts sufficient to inhibit substantial corrosion of the ballast tanks, preferably from about 1 to about 4 pounds per barrel of ballast liquid composition. Useful corrosion inhibitors are mono long chain-alkyl, triethoxylated polymethylene diamines having 12 to 22 carbon atoms per molecule, and combinations of aliphatic and heterocyclic monomines and diamines.

The alkalizer or alkalizers can be employed in amounts effective to give the composition of pH of at least about 9, preferably at least about 9.5. Alkalizers which can be employed are water soluble salts of alkali metals and alkaline earth metals, preferably alkali metals such as sodium and magnesium. The salt are substantially inert to the ballast liquid composition in total and to the various components therein. Particularly preferred alkalizers are lime, magnesia, sodium silicate, sodium aluminum silicate, and mixtures of at least two thereof.

The compositions of this invention can be prepared in a conventional manner by adding, in any desired sequence, the various ingredients of the composition to one another singly or in combination under ambient conditions of temperature, pressure, and atmosphere. The ingredients can be stirred during and/or after addition of one to the other, the amount of stirring being that which is sufficient to thoroughly disperse the ingredients and form a homogeneous mixture. Homogeneity can usually be obtained by stirring for at least 10 minutes after all the ingredients have been combined. The preferred method of mixing is to first thoroughly disperse the attapulgite in water. If a polymer is used it is added next and mixed until dispersed. If a bacteriostatic agent is used, it is added thirdly and mixed until dispersed. If alkalizers are used, they are added next with mixing. Approximately one-half of the barite is then added with stirring. After the barite, corrosion inhibitor is added and then the remainder of the barite is added. The resulting final mixture is stirred until homogeneity is obtained as mentioned above.

After preparation, the compositions of this invention can be stored or substantially immediately pumped into the ballast tanks of a vessel as desired.

The barite, attapulgite, etc. and additional desired additives such as carboxymethylcellulose can be mixed together in the substantial absence of water, shipped to the vessel as mixed, and then mixed with water at the situs of the vessel before introduction into the ballast tanks.

The ballast additive of this invention consists essentially of barite and one of attapulgite, sepiolite, chrysotile asbestos, and mixtures of at least two thereof, the barite and attapulgite, etc. being present in the weight ratio range of barite/attapulgite, etc. of from about 65/1 to about 22/1.

This additive can contain substantially no deflocculent but can contain additional additives as discussed hereinabove. When carboxymethylcellulose or other polymers mentioned above are employed, they can be present in the weight ratio range of barite/polymer of from about 650/1 to about 445/1.

The bacteriostatic agent, corrosion inhibitor, and water soluble salts of certain metals, when present, are employed in amounts of each which will give effective protection when the additive is added to or made into ballast liquid by the addition of water. For example, the amount of corrosion inhibitor present in the additive is that which, when the additive is converted into a ballast liquid, is sufficient to substantially reduce the corrosiveness of the resulting ballast liquid. Similar reasoning applies to bacteriostatic agents and the water soluble salts.

For each ballast liquid in the following Examples the effective viscosity in centipoise was measured at various shear rates measured in reciprocal seconds using a Fann V-G Meter, Model 35. The operation of the Fann F-G meter is fully and completely disclosed in "Composition and Properties of Oil Well Drilling Fluids" by W. F. Rogers, 3rd. Edition, Gulf Publishing Co., Houston, Texas, 1963, pages 133 et. seq. and American Petroleum Institute Test 13-B, the standard method for drilling mud viscosity measurements.

EXAMPLE I

A ballast liquid (Run 1) was prepared in accordance with this invention by mixing in the above preferred manner, 0.59 barrels of fresh water, 600 pounds of barite, 10 pounds of attapulgite, 1 pound paraformaldehyde and 4 pounds corrosion inhibitor composed of 4-(2-aminoethoxy) ethylmorpholine, 2-(4-morpholinylethoxy) ethanol, and bis-2-(4-morpholinyl) ethyl ether.

For comparative purposes, a ballast liquid (Run 2) was prepared by mixing in a similar manner, 0.6 barrels of fresh water, 580 pounds of barite, 13 pounds of Wyoming bentonite, and 1.3 pounds of sodium humate.

The effective viscosity of each ballast liquid was measured at various shear rates and the results are shown in the drawing and Table 1 below.

TABLE 1

| | Run 1 (Invention) | Run 2 (Prior art) |
|---|---|---|
| Effective viscosity in centipoise at: [1] | | |
| 600 r.p.m. (1022 sec.$^{-1}$) | 123 | 214 |
| 300 r.p.m. (511 sec.$^{-1}$) | 220 | 260 |
| 200 r.p.m. (341 sec.$^{-1}$) | 307 | 288 |
| 100 r.p.m. (170.5 sec.$^{-1}$) | 525 | 336 |
| 6 r.p.m. (10.22 sec.$^{-1}$) | 3,300 | 600 |
| 3 r.p.m. (5.11 sec.$^{-1}$) | 3,900 | 800 |

[1] Properties measured after aging for one week.

In the drawing, curve 1 is the ballast liquid according to this invention (attapulgite and no deflocculent) whereas curve 2 is a ballast liquid which did not contain attapulgite but employed bentonite and a deflocculent instead.

Each ballast liquid in Runs 1 and 2 had a density of 19.4 lbs./gal.

It can be seen from the drawing that at low shear rates the ballast liquid of this invention (curve 1) had a substantially higher effective viscosity than curve 2. This was quite surprising and is very advantageous in that the higher effective viscosity at low shear rate (no pumping) gives substantially increased resistance to the settling of the barite to the bottom of the ballast tank.

It can further be seen from the drawing that at high shear rates the effective viscosity of the ballast liquid of this invention (curve 1) not only was reduced to that of curve 2, but was reduced below that of curve 2 at shear rates in excess of 400 reciprocal seconds. This was equally surprising and is equally advantageous in that at high shear rates such as those encountered when pumping the liquid into or out from the ballast tanks, the effective viscosity of the liquid is low thereby making the liquid easier to pump with minimum expenditure of energy.

Thus, the use of attapulgite in lieu of bentonite and a deflocculent gave surprising flow characteristics which were advantageous in that they offered greater resistance to settling of the barite upon long standing in the ballast tanks but less resistance to pumping the liquid into or out from the ballast tanks.

EXAMPLE II

Two additional runs were made, Run 3 using attapulgite and Run 4 using bentonite but both containing 4 lbs./barrel of the corrosion inhibitor of Example I.

The entire ballast liquid preparation process was carried out at room temperature, at ambient pressure, under an air atmosphere, and according to the preferred method of mixing previously described. The formulations and properties for Runs 3 and 4 are given in Table 2 below.

TABLE 2

|  | Run 3 | Run 4 |
|---|---|---|
| Water, bbl | 0.56 | 0.52 |
| Bentonite, lbs |  | 12 |
| Attapulgite, lbs | 8 |  |
| Barite, lbs | 600 | 600 |
| CMC, pure, reg. lbs |  |  |
| Paraformaldehyde, lbs | 1 | 1 |
| Sodium humate, lbs |  | 2 |
| Corrosion inhibitor (Example I), lbs | 4 | 4 |
| Initial density, lbs./gal | 19.7 | 19.7 |
| Properties after 10 days rocking test: |  |  |
| Effective viscosity in cps. at— |  |  |
| 600 r.p.m. (1,022 sec.$^{-1}$) | 75 | 172 |
| 300 r.p.m. (511 sec.$^{-1}$) | 130 | 188 |
| 200 r.p.m. (341 sec.$^{-1}$) | 180 | 198 |
| 100 r.p.m. (170.5 sec.$^{-1}$) | 321 | 216 |
| 6 r.p.m. (10.22 sec.$^{-1}$) | 1,250 | 400 |
| 3 r.p.m. (5.11 sec.$^{-1}$) | 1,800 | 400 |
| Density, lb./gal.: |  |  |
| Upper ⅓ sample | 21.5 | 14.7 |
| Middle ⅓ sample | 21.7 | 18.8 |
| Lower ⅓ sample | 21.4 | ¹ 23.3 |

¹ Barite settled in a hard packed layer.

This example again shows the superior flow characteristics for the ballast fluid of this invention. These samples were subjected to continuous rocking action (8 cycles per minute) for 10 days, after which their properties were obtained. Samples of each were taken at the upper 1/3 level, the middle 1/3 level, and the bottom 1/3 level before agitation and the densities of each fraction were determined. Some syneresis, or water separation at the top, occurred with the sample containing attapulgite and this free water was siphoned off before taking the samples for the density measurements. Some densification of the mud occurred due to the separation of water, but the density was very nearly constant throughout the mud portion and there was no hard packed layer of solids on the bottom as there was in the sample prepared with bentonite (Run 4). This is quite apparent from the densities at the various height levels of the sample prepared with bentonite, 14.7 lbs./gal. at the top and 23.3 lbs./gal. at the bottom.

EXAMPLE III

Other runs were made, Run 5 with attapulgite and CMC and Run 6 with bentonite and CMC. These compositions were prepared by the preferred method previously described and subjected to the same rocking test described in Example II. The composition and properties of these runs are given in Table 3 below.

TABLE 3

|  | Run 5 | Run 6 |
|---|---|---|
| Water, bbl | 0.56 | 0.56 |
| Bentonite, lbs |  | 6 |
| Attapulgite, lbs | 17 |  |
| Barite, lbs | 600 | 600 |
| CMC, pure, reg. lbs | 1 | 1 |
| Paraformaldehyde, lbs | 1 | 1 |
| Sodium humate, lbs |  | 2 |
| Corrosion inhibitor (Example I), lbs | 4 |  |
| Initial density, lbs./gal | 19.9 | 19.9 |
| Properties after 10 days rocking test: |  |  |
| Effective viscosity in cps. at— |  |  |
| 600 r.p.m. (1,022 sec.$^{-1}$) | 200 | 300 |
| 300 r.p.m. (511 sec.$^{-1}$) | 256 | 380 |
| 200 r.p.m. (341 sec.$^{-1}$) | 311 | 432 |
| 100 r.p.m. (170.5 sec.$^{-1}$) | 432 | 552 |
| 6 r.p.m. (10.22 sec.$^{-1}$) | 3,000 | 2,000 |
| 3 r.p.m. (5.11 sec.$^{-1}$) | 6,000 | 3,200 |
| Density, lb./gal.: |  |  |
| Upper ⅓ sample | 19.6 | 19.1 |
| Middle ⅓ sample | 19.8 | 20.3 |
| Lower ⅓ sample | 19.7 | 20.5 |

The addition of CMC to the bentonite formulation did not produce a ballast fluid with as desirable properties as the attapulgite-CMC formulation of this invention. The effective viscosity at 1022 sec. $^{-1}$ of Run 5 was 200 cps., whereas that of Run 6 was 300 cps., or 50 percent higher. Also, the effective viscosity at 5.11 sec. $^{-1}$ of Run 5 was 6000 cps. and that of Run 6 was 3200 cps., or approximately one-half that of Run 5. The effects of the high viscosity at the lower shear rate is demonstrated by the comparison of the densities of the samples at the various height levels. The density of Run 5 changed only 0.1 lb./gal. (19.6—19.7) from the upper one-third to the bottom one-third, whereas the density of Run 6 changed by 1.4 lb./gal. (19.1—20.5). This clearly shows the superior suspending properties of the ballast fluid of this invention.

In making the comparisons shown in Examples I, II, and III, the mud densities were held constant and the other ingredients varied as necessary to obtain the proper range of flow properties. Since attapulgite does not perform in the same manner as bentonite, the same weight of attapulgite and bentonite could not be used.

Another unexpected discovery of this invention is the phenomena obtained with the combination of attapulgite and CMC. The formulations in Example I (attapulgite and bentonite without CMC) show that without CMC, less attapulgite than bentonite is required (10 lbs. vs. 13 lbs.) to obtain the desired properties, whereas with CMC (Example III) more attapulgite can be incorporated in the formula (17 lbs. vs. 6 lbs.). These additional clay solids further inhibit the settling of barite thereby giving a definite advantage to this combination.

Reasonable variations and modifications are possible within the scope of this disclosure without departing from the spirit and scope of this invention.

We claim:

1. A method of ballasting a waterborne vessel having ballast tanks therein comprising introducing into said tanks an effective ballasting amount of a composition consisting essentially of (1) subdivided barite in an amount sufficient to give said composition a density of from about 125 to about 150 pounds per cubic foot, (2) one of attapulgite, sepiolite, chrysotile asbestos, and mixtures of at least two thereof, in an amount effective for inhibiting the settling of said barite, and (3) water as substantially the remainder, said composition being further characterized by the substantial absence of any deflocculating agent.

2. The method according to claim 1 wherein said composition additionally contains one of carboxymethylcellulose, polyacrylonitrile, and vinyl maleic anhydride, and mixtures of at least two thereof, in an amount effective to inhibit settling of said barite.

3. The method according to claim 2 wherein said carboxymethylcellulose, polyacrylonitrile, vinyl maleic anhydride, and mixtures thereof are present in said composition in an amount of from about one-quarter to about 2 pounds per barrel of composition.

4. The method according to claim 2 wherein said composition contains effective amounts of at least one of bacteriostatic agent, corrosion inhibitor, and at least one water soluble salt of alkali metals and alkaline earth metals, said salt being present in an amount effective to give the composition a pH of at least about 9.

5. The method according to claim 4 wherein said bacteriostatic agent is one of paraformaldehyde, glutaraldehyde, substituted phenols, chlorinated phenols, and mixtures of at least two thereof, said corrosion inhibitor is at least one of mono long-chain alkyl, triethoxylated polymethylene diamines, and an aliphatic monoamine, an aliphatic diamine, a heterocyclic diamine, an aliphatic diamine, and mixtures of at least two thereof, and said water soluble salt is one of lime, magnesia, sodium silicate, sodium aluminum silicate, and mixtures of at least two thereof.

6. In combination, a waterborne vessel having ballast tanks, said tanks containing a ballasting amount of a composition consisting essentially of (1) subdivided barite in an amount sufficient to give said composition a density of from about 125 to about 150 pounds per cubic foot, (2) one of attapulgite, sepiolite, chrysotile asbestos, and mixtures of at least two thereof, in an amount effective for inhibiting the settling of said barite, and (3) water as substantially the remainder, said composition being further characterized by the substantial absence of any deflocculating agent.

7. The combination according to claim 6 wherein said composition additionally contains one of carboxymethylcellulose in an amount effective to inhibit settling of said barite.

8. The combination according to claim 7 wherein said carboxymethylcellulose, polyacrylonitrile, vinyl maleic anhydride, and mixtures of at least two thereof, is present in said composition in an amount of from about one-quarter to about 2 pounds per barrel of composition.

9. The combination according to claim 7 wherein said composition contains effective amounts of at least one of bacteriostatic agent, corrosion inhibitor, and at least one water soluble salt of alkali metals and alkaline earth metals, said salt being present in an amount effective to give the composition of pH of at least about 9.

10. The combination according to claim 9 wherein said bacteriostatic agent is one of paraformaldehyde, glutaraldehyde, substituted phenols, chlorinated phenols, and mixtures of at least two thereof, said corrosion inhibitor is at least one of a mono long-chain alkyl, triethoxylated polymethylene diamine, an aliphatic monoamine, an aliphatic diamine, a heterocyclic diamine, an aliphatic diamine, and mixtures of at least two thereof, and said water soluble salt is one of lime, magnesia, sodium silicate, sodium aluminum silicate, and mixtures of at least two thereof.

11. A ballast additive consisting essentially of: (1) barite, and (2) one of attapulgite, sepiolite, chrysotile asbestos, and mixtures of at least two thereof; (A) and (B) being present in the weight ratio range of 1/2: of from about 65/1 to about 22/1, said additive containing substantially no deflocculent.

12. A ballast additive according to claim 11 wherein said additive additionally contains a member of the group carboxymethylcellulose, polyacrylonitrile, vinyl maleic anhydride, and mixtures of at least two thereof, in the weight ratio range of barite/member of from about 650/1 to about 445/1.

13. A ballast additive according to claim 12 wherein said additive additionally contains at least one of bacteriostatic agent, corrosion inhibitor, and water soluble salt of alkali metals and alkaline earth metals, each ingredient present being present in amounts which will give effective protection when a ballast liquid is prepared by the addition of water.

14. A ballast additive according to claim 13 wherein said bacteriostatic agent is one of paraformaldehyde, glutaraldehyde, substituted phenols, chlorinated phenols, and mixtures of at least two thereof, said corrosion inhibitor is at least one mono long-chain alkyl, triethoxylated polymethylene diamine, an aliphatic monoamine, an aliphatic diamine, a heterocyclic diamine, an aliphatic diamine, and mixtures of at least two thereof, and said water soluble salt is one of lime, magnesia, sodium silicate, sodium aluminum silicate, and mixtures of at least two thereof.

UNITED STATES PATENT OFFICE
CERTIFICATE OF CORRECTION

Patent No. 3,556,037    Dated January 19, 1971

Inventor(s) John P. Sloan, Jr., et al.

It is certified that error appears in the above-identified patent and that said Letters Patent are hereby corrected as shown below:

Column 8, claim 11, should appear as shown below:

11. A ballast additive consisting essentially of (1) barite, and (2) one of attapulgite, sepiolite, chrysotile asbestos, and mixtures of at least 2 thereof, (A) and (B) being present in the weight ratio range of (1)/(2) of from about 65/1 to about 22/1. --.

Signed and sealed this 15th day of February 1972.

(SEAL)
Attest:

EDWARD M. FLETCHER, JR.
Attesting Officer

ROBERT GOTTSCHALK
Commissioner of Patents